United States Patent Office 3,471,402
Patented Oct. 7, 1969

3,471,402
DRILLING FLUID
James L. Shannon and Charles A. Sauber, Bartlesville, Okla., assignors to Phillips Petroleum Company, a corporation of Delaware
No Drawing. Continuation of application Ser. No. 276,079, Apr. 26, 1963. This application July 25, 1966, Ser. No. 567,366
Int. Cl. E21c 41/10; C09k 3/00
U.S. Cl. 252—8.5        8 Claims This application is a continuation application of co-pending application Ser. No. 276,079, filed Apr. 26, 1963, now abandoned.

This invention relates to drilling fluids and well working fluids for use in drilling wells with well drilling tools. In one aspect this invention relates to drilling fluids having controlled viscosity and fluid loss characteristics. In a more specific aspect this invention is directed to a drilling fluid containing asbestos and carboxymethylcellulose having a degree of substitution of at least 0.9.

In the art of drilling wells with well drilling tools, especially rotary drilling tools, it is well known that a drilling fluid is necessary and that viscosity and fluid loss characteristics are two important properties of the drilling fluid. It is also well known that these properties are difficult to control in a drilling fluid containing appreciable amounts of salt.

Many materials have been proposed and employed in attempts to control the properties of salt-containing drilling fluids including asbestos; attapulgite; and organic colloids such as starch, carboxymethylcellulose, carboxyethylcellulose, and the like. The proposed materials, however, have not successfully solved the problem of increasing and maintaining the viscosity of salt-containing, low solids drilling fluids.

It is, therefore, a principal object of this invention to provide a method for increasing the viscosity and stability of salt-containing drilling fluids. It is also an object of the invention to provide a salt-containing drilling fluid having stable viscosity property at a desired level. A further object is to provide a drilling fluid additive for control of viscosity and fluid loss properties of fresh water, salt water and emulsion drilling fluids. Other objects and advantages of the invention will be apparent to those skilled in the art upon study of the disclosure of the invention.

We have found that a combination of asbestos and a water-soluble salt of carboxymethylcellulose having a degree of substitution of at least 0.9 will provide an unexpected increase in the viscosity of an aqueous drilling fluid. The combination is effective in either fresh water or salt water drilling fluids, but it finds its greatest utility in salt water drilling fluids because salt water drilling fluids are generally more difficult to control than are the fresh water drilling fluids. The amount of carboxymethylcellulose utilized will usually be between about 0.1 and 10 pounds per barrel of drilling fluid and the asbestos will usually be between about 0.5 and 15 pounds per barrel of drilling fluid.

We have found that a synergistic effect results when these two materials are added to either a fresh water or a salt water drilling fluid, particularly with respect to the viscosity increase of the drilling fluid. We have also found that the resulting drilling fluid is stable with respect to viscosity and fluid loss properties. The carboxymethylcellulose degree of substitution of 0.9 (CMC 9) reduces the fluid loss properties of the drilling fluid, whereas the asbestos generally increases the fluid loss properties; therefore, the ratio of CMC 9 and asbestos can be adjusted to provide both the desired viscosity and desired fluid loss properties of the treated drilling fluid.

The invention is applicable to emulsion drilling fluids and is practiced in the same manner when an emulsion fluid is treated.

Asbestos has heretofore been proposed for use in drilling fluids as a viscosifier and as a lost circulation agent for plugging thief formations in well drilling operations. Any of the types and grades of asbestos which have utility in drilling fluids can be employed in the practice of this invention; however, asbestos classified as Group 7 according to the Quebec Screen Test adopted by the Quebec Asbestos Producers Association shown on page 138 of "Encyclopedia of Chemical Technology," volume 2 (1948), is preferred for reasons of economy. Such asbestos is sometimes referred to as "shorts" and "floats" in the asbestos industry. The longer fiber asbestos can be used in the practice of this invention but does not provide noticeably superior results and is more expensive. For example, asbestos of the grade of Group 4 costs about 3 or 4 times that of Group 7. The asbestos can be Canadian chrysotile or California asbestos designated as Coalinga. California asbestos identified as Coalinga 120 is comparable to Canadian asbestos Group 7. Coalinga asbestos has chemical properties similar to Canadian chrysotile but differs in some physical properties; for example, the surface area of Coalinga asbestos is more than twice that of Canadian chrysotile asbestos.

The degree of substitution for carboxymethylcellulose is the average number of carboxylic groups per anhydroglucose unit. For complete substitution, the degree of substitution is 3. A sodium salt of carboxymethylcellulose (CMC) having a degree of substitution greater than about 0.3 is generally water soluble or water dispersible.

High viscosity CMC (sodium carboxymethylcellulose) in general use presently has a degree of substitution of about 0.7. The CMC of the present invention has a degree of substitution of at least 0.9 and can be higher, e.g., 1.2 or 1.5 or even higher.

CMC 9, in proper concentration, reduces the fluid loss properties of any drilling fluid and also increases the viscosity of any drilling fluid. These effects are more pronounced in fresh water drilling fluids than in salt water drilling fluids. The desired control of a fresh water drilling fluid, a saturated salt water drilling fluid, or a drilling fluid with any intermediate salt concentration can often be obtained with the use of CMC 9 alone, or with the addition of a very small amount of asbestos. CMC 9 does not display the tendency to foam that is observed in some of the polymers proposed for use in salt water drilling fluids.

Any of the water-soluble salts of carboxymethylcellulose having a degree of substitution of at least 0.9 can be used in the practice of the invention and such soluble salts are well known. The sodium salt is usually preferred for reasons of economy and availability.

In the following examples, the drilling fluids were tested according to "API Recommended Practice Standard Procedure for Testing Drilling Fluids," API–RP–29 or API–RP–13B (1962 edition). The tests for apparent viscosity (AV), plastic viscosity (PV), yield point (YP), fluid loss or water loss (WL), and gels were not changed in the 1962 edition so that tests made prior to 1962 are comparable with those made after the 1962 edition was published.

Apparent viscosity (AV) and plastic viscosity (PV) are recorded in centipoises. Yield point (YP) and gel strength (Gels), (initial/10 min.) are reported in pounds per 100 sq. ft.

EXAMPLE I

The stated materials were added to saturated brine (sodium chloride in water) in the stated amount, stirred for 10 minutes at room temperature on a Hamilton-Beach malted milk mixer and tested, when only the asbestos samples were employed. In the runs wherein both asbestos and attapulgite were added the brine containing the additives was stirred for one hour, aged about 4 hours, stirred for 10 minutes and tested, all at room temperature. The results of the runs are shown in Table I.

TABLE I

Materials Added to Saturated Brine

| Group 7MF5, Canadian Asbestos, lb./bbl. | Coalinga 120 Asbestos, lb./bbl. | Attapulgite, lb./bbl. | Apparent Viscosity, cp. |
|---|---|---|---|
| 2.5 | 0 | 0 | 8 |
| 5 | 0 | 0 | 12 |
| 10 | 0 | 0 | 20 |
| 0 | 2.5 | 0 | 12 |
| 0 | 5 | 0 | 16 |
| 0 | 10 | 0 | 34 |
| 0 | 0 | 2.5 | 2 |
| 0 | 0 | 5 | 4 |
| 0 | 0 | 10 | 8 |
| 0 | 1.25 | 1.25 | 10 |
| 0 | 2.5 | 2.5 | 16 |
| 0 | 5 | 5 | 32 |

EXAMPLE II

Coalinga asbestos and Canadian asbestos were compared in a fresh water drilling fluid made up of 3½ weight percent attapulgite in distilled water. The apparent viscosity of the base drilling fluid after the stated amount of asbestos was added and stirred for 30 minutes and 60 minutes in each run is shown in Table II.

TABLE II

| | Base Drilling Fluid Coalinga 120 asbestos, lb./bbl. | Apparent Viscosity, cp., after stirring for | |
|---|---|---|---|
| | | 30 Min. | 60 Min. |
| Materials Added to Group 7MF5 Canadian Asbestos lb./bbl.: | | | |
| 0 | 0 | 13 | 13 |
| 2 | 0 | 20 | 20 |
| 5 | 0 | 31 | 30 |
| 0 | 2 | 22 | 26 |
| 0 | 5 | 46 | |

EXAMPLE III

Sodium carboxymethylcellulose samples having a degree of substitution of 0.7 (CMC #7) and 0.9 (CMC #9) respectively are compared in the following Table III.

TABLE III

| Additive 2 lb./bbl. | AV | PV | YP | Gels | WL |
|---|---|---|---|---|---|
| #1 Base Fluid (3½% Attapulgite in 5% NaCl): | | | | | |
| Base Fluid | 9.5 | 4 | 11 | 9/20 | 160 |
| CMC 7 | 24.5 | 17 | 15 | 6/30 | 11.6 |
| CMC 9 | 33 | 20 | 26 | 5/5 | 10.9 |
| #2 Base Fluid (3½% Attapulgite in 26% NaCl): | | | | | |
| Base Fluid | 11.5 | 6 | 11 | 7/15 | 122 |
| CMC 7 | 26 | 20 | 13 | 5/16 | 31 |
| CMC 9 | 32.5 | 22 | 21 | 7/13 | 15.4 |
| #3 Base Fluid (3½% Attapulgite, 2 lb./bbl. Gypsum, Distilled Water): | | | | | |
| Base Fluid | 8.5 | 4 | 9 | 6/10 | 150 |
| CMC 7 | 30 | 18 | 24 | 6/71 | 12 |
| CMC 9 | 44 | 22 | 44 | 12/89 | 10.4 |
| #4 Base Fluid (Natural, Saturated West Texas Brine): | | | | | |
| CMC 7 | 11.5 | 11 | 1 | 1/1 | |
| CMC 9 | 32 | 23 | 18 | 2/2 | |
| #5 Base Fluid (Distilled Water): | | | | | |
| CMC 7 | 38.5 | 24 | 29 | 2/5 | |
| CMC 9 | 56 | 32 | 50 | 6/7 | |

CMC 9 is superior to CMC 7 in viscosity increase and fluid loss decrease in the fluid systems of Table III, particularly in saturated salt base fluid.

EXAMPLE IV

In the following Table IV, the performance of CMC 9 is compared to that of CMC 7 in fluid systems in combination with asbestos (Coalinga 120, having properties of Group 7 Canadian asbestos).

TABLE IV.—FLOW PROPERTIES OF SALT-CONTAINING DRILLING FLUID

| Additive | Lb./bbl. | AV | PV | YP | Gels |
|---|---|---|---|---|---|
| #1 Base Fluid (Native Red Bed Salt Drilling Fluid): | | | | | |
| Base Fluid | | 5 | 2 | 6 | 2/4 |
| CMC 9 | 0.2 | 7 | 5 | 4 | 3/4 |
| CMC 7 | 0.2 | 5.5 | 4 | 3 | 3/3 |
| Starch | 1.0 | 7 | 4 | 6 | 2/2 |
| #2 Base Fluid (#1 Base Fluid plus 2 lb./bbl. Asbestos): | | | | | |
| Base Fluid | | 11.5 | 5 | 13 | 7/7 |
| CMC 9 | 0.2 | 31 | 12 | 38 | 13/12 |
| CMC 7 | 0.2 | 13 | 6 | 14 | 5/6 |
| Starch | 1.0 | 16 | 5 | 22 | 5/7 |
| #3 Base Fluid (#1 Base Fluid plus 10 lb./bbl. Attapulgite): | | | | | |
| Base Fluid | | 15 | 8 | 14 | 11/16 |
| CMC 9 | 0.2 | 19.5 | 7 | 25 | 15/10 |
| CMC 7 | 0.2 | 15.5 | 7 | 17 | 15/18 |
| Starch | 1.0 | 13 | 6 | 14 | 10/15 |

It should be noted that CMC 9 raised the viscosity of the fluid from 5 to 7, asbestos raised the viscosity from 5 to 11.5, and a combination of CMC 9 and asbestos raised the viscosity from 5 to 31. If the effects were additive, a viscosity of about 13 would be expected. The combined effects of asbestos with either CMC 7 or starch are approximately additive.

EXAMPLE V

Coalinga 120 asbestos and CMC 9 were added to a Texas Panhandle drilling fluid having a density of 9.65 lb./gal. and a chloride ion concentration of 72,000 p.p.m. The chloride ion concentration was present principally as sodium chloride. Results are shown in Table V.

TABLE V.—FLOW PROPERTIES OF SALT DRILLING FLUIDS

| Additives, lb./bbl. | | Properties | | | |
|---|---|---|---|---|---|
| Asbestos | CMC 9 | AV | PV | YP | Gels |
| 0 | 0 | 7 | 2 | 10 | 6/7 |
| 0 | 0.2 | 11.5 | 5 | 13 | 7/7 |
| 2.2 | 0 | 16.5 | 3 | 27 | 6/7 |
| 2.0 | 0.2 | 32 | 8 | 48 | 24/15 |

The addition of 0.2 lb./bbl. of CMC 9 raised the viscosity of the drilling fluid 4.5 centipoises (cp.) and the addition of 2.2 lb./bbl. of asbestos raised the viscosity 9.5 cp.; however, the combination of CMC 9 and asbestos raised the viscosity 25 cp.

Coalinga 120 asbestos and CMC 9 were added to a high solids oil field drilling fluid from West Texas, which was diluted with a salt-saturated oil field brine and had a density of 10.3 lb./gal. The results are shown in Table VI.

TABLE VI.—FLOW PROPERTIES OF SALT-SATURATED DRILLING GLUID

| Additives, lb./bbl. | | Properties | | | |
|---|---|---|---|---|---|
| Asbestos | CMC 9 | AV | PV | YP | Gels |
| 0 | 0 | 4 | 3 | 2 | 1/1 |
| 0 | 0.2 | 7.5 | 5 | 5 | 5/5 |
| 2.2 | 0 | 10 | 4 | 12 | 4/3 |
| 2.0 | 0.2 | 26.5 | 11 | 31 | 10/9 |

Here again the increase in viscosity obtained by the combination of CMC 9 and asbestos was about twice the increase predictable from the increase provided by these materials added separately.

The data presented in Tables I–VI were obtained under controlled conditions on synthetic and actual drilling fluids so that the results would be on comparable bases. The results show that a synergistic effect is obtained by combining CMC 9 and asbestos. Actual use in drilling wells in West Texas and the Oklahoma Panhandle has demonstrated that synergism resulted in all of the proportions of CMC 9 and asbestos employed. These proportions varied from about 0.1 to 2 lb./bbl. of CMC 9 and about 0.5 to 10 lb./bbl. of asbestos. In field use the CMC 9 was usually added to a drilling fluid containing asbestos because asbestos is added as a viscosifier, being the cheaper material. Then if the desired viscosity is not obtained with asbestos, CMC 9 is added. Field usage has indicated that a desired viscosity level can be obtained and maintained with about half the quantity of CMC 9 and asbestos combined as would be required of either alone. For reasons of economy, about 10 parts of asbestos are often used with 1 part of CMC 9 by weight.

The addition of CMC 9 to a drilling fluid usually decreases the fluid loss whereas the addition of asbestos to a drilling fluid usually increases the fluid loss. Therefore, the ratio of CMC 9 to asbestos in the combination will often be determined by the fluid loss property desired in the particular drilling fluid under consideration. The combination of CMC 9 and asbestos has provided a solution to the problem of viscosifying a low-solids, salt water drilling fluid while at the same time providing adequate fluid loss control of the drilling fluid.

Asbestos and CMC 9, both being dry, particulate materials, can be combined and prepackaged for use or can be added separately. CMC 9 or asbestos can also be added to a drilling fluid treated with a combination of asbestos and CMC 9.

The prepackaged combination will usually contain from about 10 to 50 weight percent CMC 9, the remainder being asbestos.

What is claimed is:

1. An aqueous drilling fluid containing California asbestos designated as Coalinga asbestos having a surface area more than twice that of Canadian chrysotile asbestos and a water-soluble salt of carboxymethylcellulose having a degree of substitution of about 0.9 in amounts sufficient to raise the viscosity of the drilling fluid substantially, the asbestos being present in an amount of at least about 0.5 pound per barrel of drilling fluid and the water-soluble salt being present in an amount of at least about 0.1 pound per barrel of drilling fluid.

2. The drilling fluid of claim 1 containing about 0.1 to 10 pounds per barrel of the water-soluble salt and about 0.5 to 15 pounds per barrel of fluid of the asbestos.

3. The drilling fluid of claim 1 wherein the ratio of the water-soluble salt to asbestos is between about 0.1 and 1 part by weight per 1 part of asbestos and the total amount of the combination of the water-soluble salt and the asbestos is between about 0.6 and 25 pounds per barrel of drilling fluid.

4. The drilling fluid of claim 1 containing about 0.1 to 2 pounds per barrel of drilling fluid of the water-soluble salt and about 0.5 to 10 pounds per barrel of drilling fluid of the asbestos.

5. A drilling fluid additive comprising about 10 to 50 weight percent of a water-soluble salt of carboxymethylcellulose having a degree of substitution of about 0.9 and about 50 to 90 weight percent of California asbestos designated as Coalinga asbestos having a surface area more than twice that of Canadian chrysotile asbestos.

6. The drilling fluid additive of claim 5 comprising about 10 parts by weight of the asbestos and about 1 part by weight of the water-soluble salt.

7. In the process of drilling a well with well drilling tools wherein an aqueous drilling fluid is circulated in the well, the improvement which comprises admixing with each barrel of said drilling fluid about 0.5 to 15 pounds of California asbestos designated as Coalinga asbestos having a surface area more than twice that of Canadian chrysotile asbestos and a viscosity increasing amount of a water soluble salt of carboxymethylcellulose having a degree of substitution of about 0.9, said carboxymethylcellulose being incorporated in the drilling fluid in a ratio of carboxymethylcellulose to asbestos of about 1 to 10, and circulating the resulting drilling fluid in said well.

8. The process of claim 7 wherein the carboxymethylcellulose is added in the viscosity increasing amount of about 0.1 to 10 pounds per barrel of drilling fluid.

References Cited

UNITED STATES PATENTS

| 2,727,001 | 12/1955 | Rowe | 252—8.5 |
| 2,830,948 | 4/1958 | Popham | 252—8.5 |
| 3,081,260 | 3/1963 | Park | 252—8.5 |

FOREIGN PATENTS

| 202,994 | 6/1955 | Australia. |

OTHER REFERENCES

Munro et al., Coalinga-Newcomer to the Asbestos Industry, article in Mining Engineering, September 1962, pp. 60, 61 and 62 (copy in Sci. Lib).

HERBERT B. GUYNN, Primary Examiner